United States Patent
Rovinsky (10) Patent No.: US 7,768,631 B1
(45) Date of Patent: Aug. 3, 2010

(54) METHOD AND SYSTEM FOR PROVIDING A KNOWN REFERENCE POINT FOR AN AIRBORNE IMAGING PLATFORM

(75) Inventor: Jacob Rovinsky, Modiin (IL)

(73) Assignee: Israel Aerospace Industries Ltd., Lod (IL)

( * ) Notice: Subject to any disclaimer, the term of this patent is extended or adjusted under 35 U.S.C. 154(b) by 344 days.

(21) Appl. No.: 12/073,676

(22) Filed: Mar. 7, 2008

(30) Foreign Application Priority Data

Mar. 13, 2007 (IL) .................................. 181889

(51) Int. Cl.
*G01B 11/26* (2006.01)

(52) U.S. Cl. ........................ 356/139.01; 356/139.02; 356/139.04; 356/139.05

(58) Field of Classification Search ............. 356/139.01
See application file for complete search history.

(56) References Cited

U.S. PATENT DOCUMENTS

| | | | |
|---|---|---|---|
| 3,572,940 A | 3/1971 | Poubeau | |
| 4,682,300 A | 7/1987 | Seto et al. | |
| 4,809,066 A | 2/1989 | Leberl et al. | |
| 4,879,664 A | 11/1989 | Suyama et al. | |
| 5,187,754 A | 2/1993 | Currin et al. | |
| 5,309,522 A | 5/1994 | Dye | |
| 5,764,819 A | 6/1998 | Orr et al. | |
| 5,995,681 A | 11/1999 | Lee et al. | |
| 6,043,778 A * | 3/2000 | Froeberg et al. | 342/357.14 |
| 6,529,267 B1 * | 3/2003 | Duchon et al. | 356/2 |
| 6,607,527 B1 | 8/2003 | Ruiz et al. | |
| 6,680,693 B2 | 1/2004 | Urban et al. | |
| 6,734,952 B2 | 5/2004 | Benz et al. | |
| 6,735,348 B2 | 5/2004 | Dial, Jr. et al. | |
| 7,115,851 B2 | 10/2006 | Zhang | |
| 7,382,448 B1 * | 6/2008 | Hedrick et al. | 356/139.01 |
| 2002/0012460 A1 | 1/2002 | Kochi et al. | |
| 2002/0060734 A1 | 5/2002 | Hino et al. | |
| 2002/0061132 A1 | 5/2002 | Furukawa | |
| 2003/0044085 A1 | 3/2003 | Dial, Jr. et al. | |
| 2003/0147553 A1 | 8/2003 | Chen et al. | |

(Continued)

FOREIGN PATENT DOCUMENTS

EP    1 662 228 A1    5/2006

*Primary Examiner*—Thomas H Tarcza
*Assistant Examiner*—Luke D Ratcliffe
(74) *Attorney, Agent, or Firm*—Oliff & Berridge, PLC (57) ABSTRACT

Method for providing a known reference point for an airborne imaging system, the method including providing at measured earth co-ordinates a camera/mirror assembly having a camera and a mirror mounted in fixed mutual spatial relationship and capable of tilting about two mutually orthogonal axes. Using the camera to track the sun and produce at least two or more different measured times respective time tagged camera images. Using the time tagged camera images to obtain a transformation of mirror axes relative to axes of the earth at a mirror location on the earth where the mirror is mounted.

During a time window when the mirror is within a line of sight of the airborne imaging system and the sun, adjusting the azimuth and elevation of the mirror so that the sun is reflected by the mirror toward the airborne imaging system thereby capturing an image of the mirror in an aerial image produced by the airborne imaging system. Determining a location in the aerial image corresponding to the mirror thus providing a known earth reference location in said aerial image.

19 Claims, 5 Drawing Sheets

U.S. PATENT DOCUMENTS

2004/0208396 A1 10/2004 Gunther et al.
2004/0234123 A1 11/2004 Shirai et al.
2005/0031197 A1 2/2005 Knopp
2005/0271301 A1 12/2005 Solomon et al.
2006/0201498 A1 9/2006 Olsson et al.

* cited by examiner

METHOD AND SYSTEM FOR PROVIDING A KNOWN REFERENCE POINT FOR AN AIRBORNE IMAGING PLATFORM

FIELD OF THE INVENTION

This invention relates to aerial mapping.

BACKGROUND OF THE INVENTION

Airborne platforms such as observation satellites having an on-board camera are used to map geographic terrain. Proper registration of the camera image relative to the terrain is subject to various inaccuracies arising, for example, from instabilities in the camera characteristics, atmospheric variations, and changes in satellite orbit. In order to ensure accurate correlation between the mapped area imaged by the camera and the actual terrain, it is known to employ location markers whose coordinates relative to the earth are precisely known. When an aerial image containing such location markers is subsequently processed, the location markers enable the image to be accurately calibrated so that the location in space of all other features in the image may be accurately determined.

Figure 1:
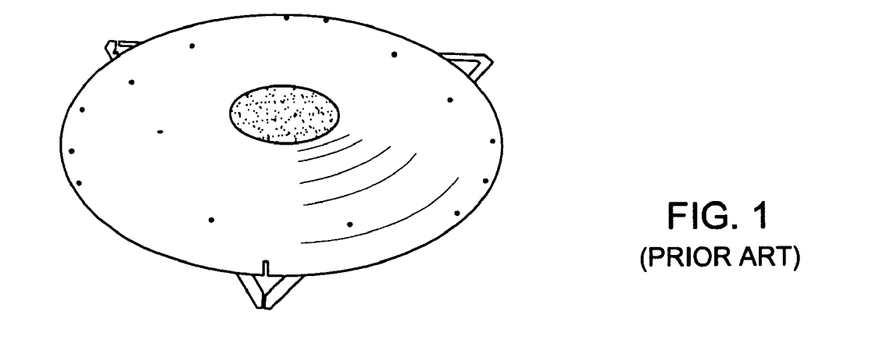
FIG. 1 is a pictorial representation of a prior art location marker.

Clearly, for such an approach to be operable, it is essential that the location markers be visible to the airborne camera. In order for this requirement to be achieved when observation satellites are used, it is known to employ large static resolution targets, such as circular dishes shown in FIG. 1 having a diameter of between 2-10 meter whose center coordinate is accurately known. It is fairly simple to process the resulting image to determine the center of the circular image corresponding to the circular dish and thus to obtain the satellite camera calibration characteristics. However, owing to the large dimensions of the resolution targets, such location markers occupy a commensurately large area of land, which is thus unavailable for other uses. An additional drawback of such markers results from their being their static relative to the earth thus requiring that the satellite undertake special maneuvers to calibrate the camera and ensure that it properly tracks the satellite.

US2005/271301 to Rafael Armament Development Authority Ltd. discloses a method and system for providing a platform with pseudo-autonomous correlation between a perspective view generated by a platform-based imaging sensor and an orthogonal photographic representation. This requires registration of a perspective image with an orthogonal photographic representation which allows features in the perspective image to be associated with their geographic locations. Conventional techniques for performing the registration are used.

US2003/044085 discloses a method for photogrammetric block adjustment of satellite imagery using a simplified adjustment model in-lieu of a physical camera model. A known relationship between image space line and sample coordinate and object space X, Y, Z coordinates is provided by a mathematical model. Observations comprise ground control points, tie points, or other observations for which approximate knowledge of object and image space coordinates is available. No detailed description of the tie points is provided.

US2004/234123 discloses a surveying system that comprises a position relation calculating processor, a correspondence establishing processor, and an image processor is provided. The position relation calculating processor calculates a positional relation between a coordinate system to which measurement information of a measurement point refers and an image of a surveying field, where a staking point is included. The correspondence establishing processor establishes correspondence between three-dimensional position information of the staking point and two-dimensional position information of a point corresponding to the staking point on the schematic image. The image processor superimposes a symbol that indicates the position of the staking point on the schematic image in accordance with the above correspondence.

EP1662228 relates to a method and system for scanning a three-dimensional object comprising scanning a surface of the object from a first scanning position, generating a first scanning sample comprising a point cloud having data points corresponding to positions on the surface of the object determining the coordinates of the first scanning position by a satellite based positioning system, correcting the inaccuracy of the positioning system by using an additional error signal scanning the surface of a three-dimensional object from at least one further scanning position, generating at least one further scanning sample comprising such a point cloud determining the coordinates of the at least one further scanning position by the positioning system, again correcting the inaccuracy of the positioning system registering the first and the at least one further scanning samples based on the first and the at least one further scanning positions, such that the samples are oriented relatively to each according to the orientation of the respective surfaces of the three-dimensional object.

U.S. Pat. No. 6,680,693 (Urban et al.) discloses a method and apparatus to track the position of the sun and direct a static ground-mounted object to the direction of the sun. The object may include a solar collector, solar cell, or test panel, among other possible devices or applications requiring near continuous exposure to rays of the sun. The apparatus uses a GPS device to determine the position of the object on the earth. The apparatus includes a controller operatively coupling to the GPS device for calculating the relative position of the sun with respect to the object. The controller operatively couples to a positioning system that includes a first drive and a second drive coupled to the object. Commands from the controller operate the positioning system to articulate the object and automatically direct it towards the relative position of the sun.

Some of these references teach techniques relating to navigation and tracking that are generally applicable to the present invention and to this extent there complete disclosures are incorporated herein by reference. None of them addresses the need to provide compact location markers, which are clearly visible to a satellite imaging system so as to allow precise calibration of their spatial coordinates. Nor do they appear to relate to mobile location markers that avoid the need for satellite adjustment.

It would be preferable if the location markers were more compact so as to occupy less land, while nevertheless being clearly visible to the satellite imaging system and yet allowing precise calibration of their spatial coordinates. It would likewise be preferable that they be mobile to avoid the need for satellite maneuvers to calibrate the camera.

SUMMARY OF THE INVENTION

According to the invention there is provided a method for providing a known reference point for an airborne imaging system, the method comprising:

(a) providing at measured earth co-ordinates a camera/mirror assembly having a camera and a mirror mounted in fixed mutual spatial relationship and capable of tilting about two mutually orthogonal axes;

(b) using said camera to track the sun and produce at least two or more different measured times respective time tagged camera images;

(c) using said time tagged camera images to obtain a transformation of mirror axes relative to axes of the earth at a mirror location on the earth where the mirror is mounted;

(d) during a time window when the mirror is within a line of sight of the airborne imaging system and the sun, adjusting the azimuth and elevation of the mirror so that the sun is reflected by the mirror toward the airborne imaging system thereby capturing an image of the mirror in an aerial image produced by the airborne imaging system; and (e) determining a location in the aerial image corresponding to the mirror thus providing a known earth reference location in said aerial image.

According to another aspect of the invention there is provided a location marker adapted to be visible to an airborne imaging system so as to allow precise calibration of spatial coordinates thereof, said location marker comprising a mirror capable of tilting about mutually orthogonal axes to track the sun and reflect the sun to said airborne imaging system.

According to yet another aspect of the invention there is provided a system for providing a known reference point for an airborne imaging system, the system comprising:

a location marker comprising a mirror capable of tilting about mutually orthogonal axes to track the sun and reflect the sun to said airborne imaging system;

a camera mounted in known spatial relationship with respect to the mirror for imaging the sun during tracking;

a computation unit coupled to the location marker and responsive to an image of the sun imaged by said camera to obtain a transformation of mirror axes relative to axes of the earth at a mirror location on the earth where the mirror is mounted;

a time window computation unit for computing a time window when the mirror is within a line of sight of the airborne imaging system and the sun within line of sight of the mirror;

a mirror adjustment unit coupled to the location marker for adjusting azimuth and elevation of the mirror so that the sun is reflected by the mirror toward the airborne imaging system thereby capturing an image of the mirror in an aerial image produced by the airborne imaging system; and a location determination unit for determining a location in the aerial image corresponding to the mirror thus providing a known earth reference location in said aerial image.

The invention provides a method and system adapted for precise calibration of a satellite imaging system. The system is adaptive and is based on aligning the sun's beam toward to the satellite imaging system by a mirror. The system performs automatic self-alignment of the mirror relative to the earth's axes at the location on earth where the mirror is mounted and uses the aligned mirror to track the sun and the satellite with time. Processing of the satellite images containing images of the sun reflected by the mirror allows false artifacts to be filtered out so as to provide an accurate location of the landmark points at the image. Tracking the satellite by the reflected beam of the sun allows stereoscopic images derived at different times to be processed so as to derive the earth-based coordinates of the mirror location. The mirror thus serves as a compact marker that pinpoints a spatial location of the earth where the marker is fixed. This allows the exact location of any other feature in the image to be determined. In the case that several different such markers are imaged simultaneously, the exact locations of other feature in the image can also be determined using spatial correlation. The marker, though compact, conveys a sufficiently bright reflection of the sun to the satellite imaging system to permit the use of known super resolution methods for refining the calibration of the marker's location to the sub pixel level.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Various methods for tracking a satellite will now be described with reference to FIGS. 2 to 7 of the drawings. To the extent that similar the same components or components having the same functionality are shown in more than one figure, identical reference numerals will be used.

Figure 2:
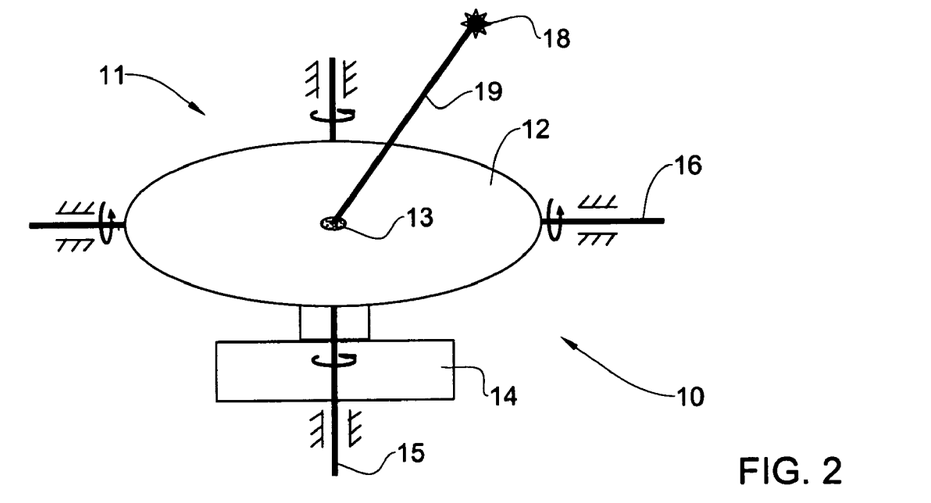
FIG. 2 is a schematic representation showing a location marker according to the invention.

FIG. 2 shows schematically a location marker 10 according to one embodiment of the invention having a mirror/camera assembly 11 comprising a mirror 12 that, for the sake of explanation, is assumed to be circular and a focal plane array (FPA) 13 mounted at the center of the mirror and having a lens (not shown) focused on infinity. The mirror 12 which is mounted on a pan-tilt unit 14 for rotation about two mutually orthogonal axes 15 and 16 rotates within an imaginary sphere 17 (shown in FIG. 3a) whose diameter is equal to that of the mirror. The mirror/camera assembly 11 is rotated by the pan-tilt unit 14 so as to track the sun 18 and align the FPA 13 so that the image of the sun appears in the center of the FPA. The mirror/camera assembly 11 will then be orthogonal to a common line of sight 19 with the sun having known azimuth and elevation. This self-alignment of the mirror is achieved using measured rotations in yaw and pitch directions of the pan-tilt unit. This notwithstanding, the initial spatial locations of the mirror and camera are not known.

Figure 3A:
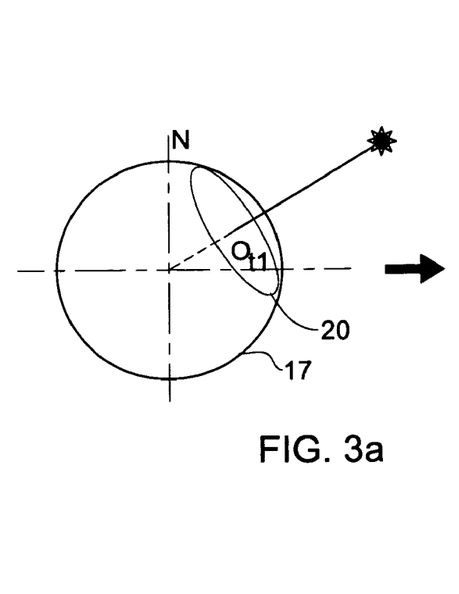
FIGS. 3a and 3b are schematic representations useful for explaining ambiguity associated with a single measurement.

FIG. 3a shows the point of intersection denoted $Ot_1$ between the camera line of sight 19 and the envelope of the sphere 17 after self-alignment of the sun to the center of the mirror/camera assembly at an initial time, $t_1$. The geometric location of the intersection points of the line of sight and the envelope of the sphere 17 in the initial situation of the FPA (before tracking and alignment with the sun) forms a circle 20 around the surface of sphere.

It emerges from this that a single image is insufficient to permit selection of a single point on this circle defining the locus of possible spatial locations of the FPA. This indeterminacy arises from the fact that there are three unknowns in transforming between the known coordinates of the sun, whose trajectory in space is known, and the local coordinates of the FPA relative to the earth's axes where only two angles, namely yaw and pitch, are measured. It should be noted that the plane of above-mentioned circle is perpendicular to the line which passes through the center of the sphere and the center of the sun (this being the direction of roll around the line of sight).

Figure 3B:
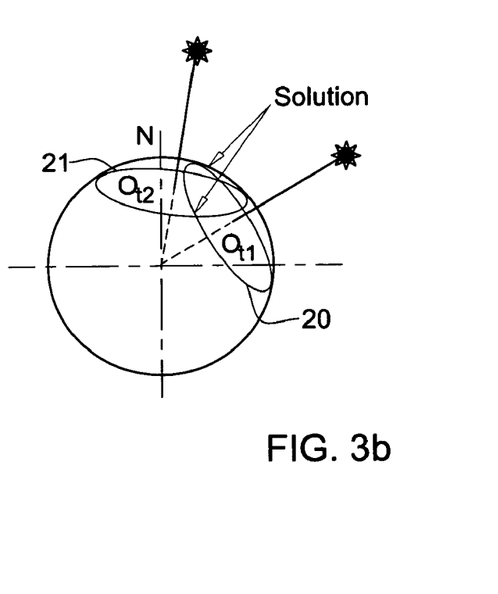

FIG. 3b shows a solution to this indeterminacy by capturing an additional image of the sun centered on the FPA at a different time, t2. In this way, there is obtained in a similar manner an additional circle 21 defining a possible locus of the FPA. Seeing that the two circles 20 and 21 are obtained using the same apparatus, the intersection of the two circles provides two possible solutions.

Figure 4:
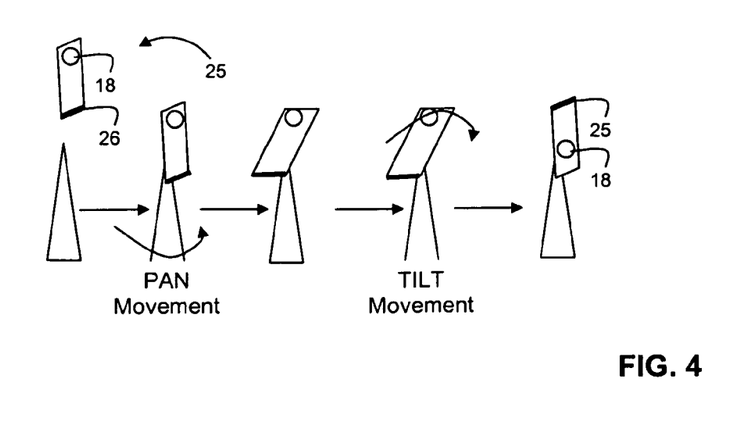
FIG. 4 shows pictorially a series of images depicting tracking the sun by a mirror capable of unlimited rotation through 360°.

FIG. 4 shows schematically a planar mirror 25 having an edge shown as a thick line 26. In the case where the mirror 25 is capable of unlimited rotation through 360°, there are always two identical solutions for sun beam reflection mirror angles corresponding respectively to the situations where the edge 26 appears as the lower edge below the sun 18 (shown in the left-hand image); and where it appears as the upper edge above the sun (shown in the right-hand image). In case of unlimited movement of the mirror (360°) both solutions are admissible. Otherwise, in the case that movement of the mirror is limited, the hardware limitation should be taken into account and the solution should be chosen that provides the best capability of satellite tracking.

Figure 5:
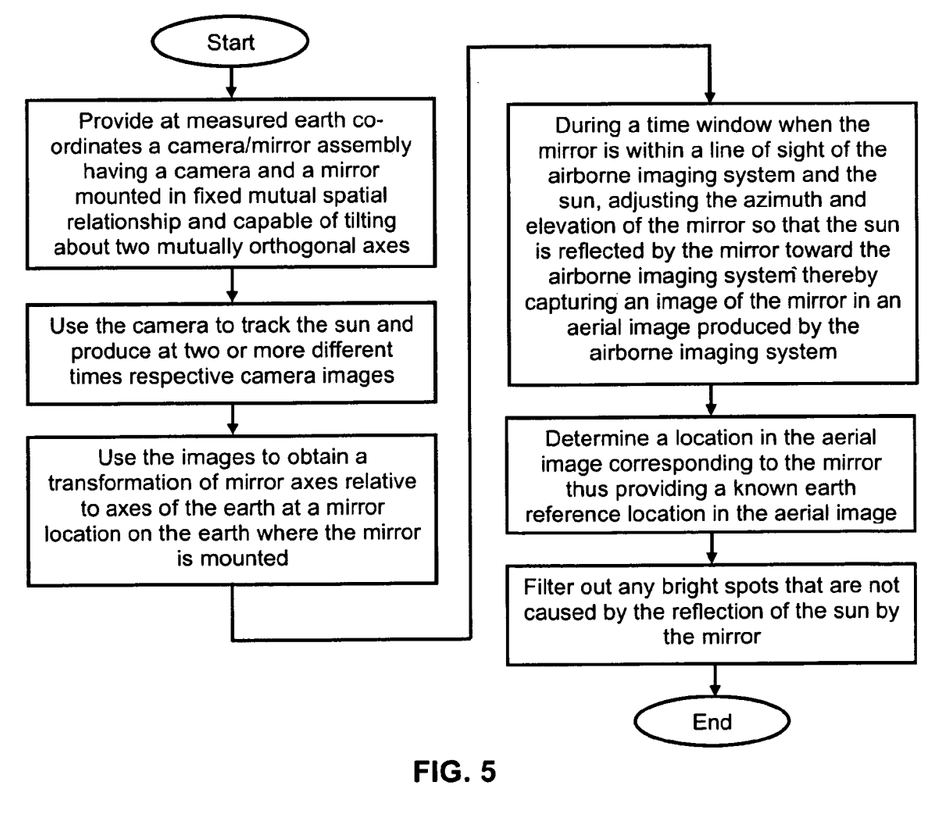
FIG. 5 is a flow diagram showing the principal operations carried out by a method for tracking a satellite according to a first embodiment of the invention.

FIG. 5 is a flow diagram summarizing the principal operations carried out by a method for tracking an airborne imaging system such as a satellite according to a first embodiment of the invention. Thus, at measured earth coordinates a camera/mirror assembly 11 is provided having a mirror 12 and a camera 13 mounted in fixed mutual spatial relationship and capable of tilting about two mutually orthogonal axes. The camera 13 is used to track the sun and produce at two or more different times respective camera time tagged images, which are used to obtain a transformation of mirror axes relative to axes of the earth at a mirror location on the earth where the mirror is mounted. During a time window when the mirror is within a line of sight of the airborne imaging system and the sun, the azimuth and elevation of the mirror are adjusted so that the sun is reflected by the mirror toward the airborne imaging system thereby capturing an image of the sun reflected by the mirror in an aerial image produced by the airborne imaging system. A location in the aerial image is then determined corresponding to the mirror thus providing a known earth reference location in the aerial image.

Figure 6:
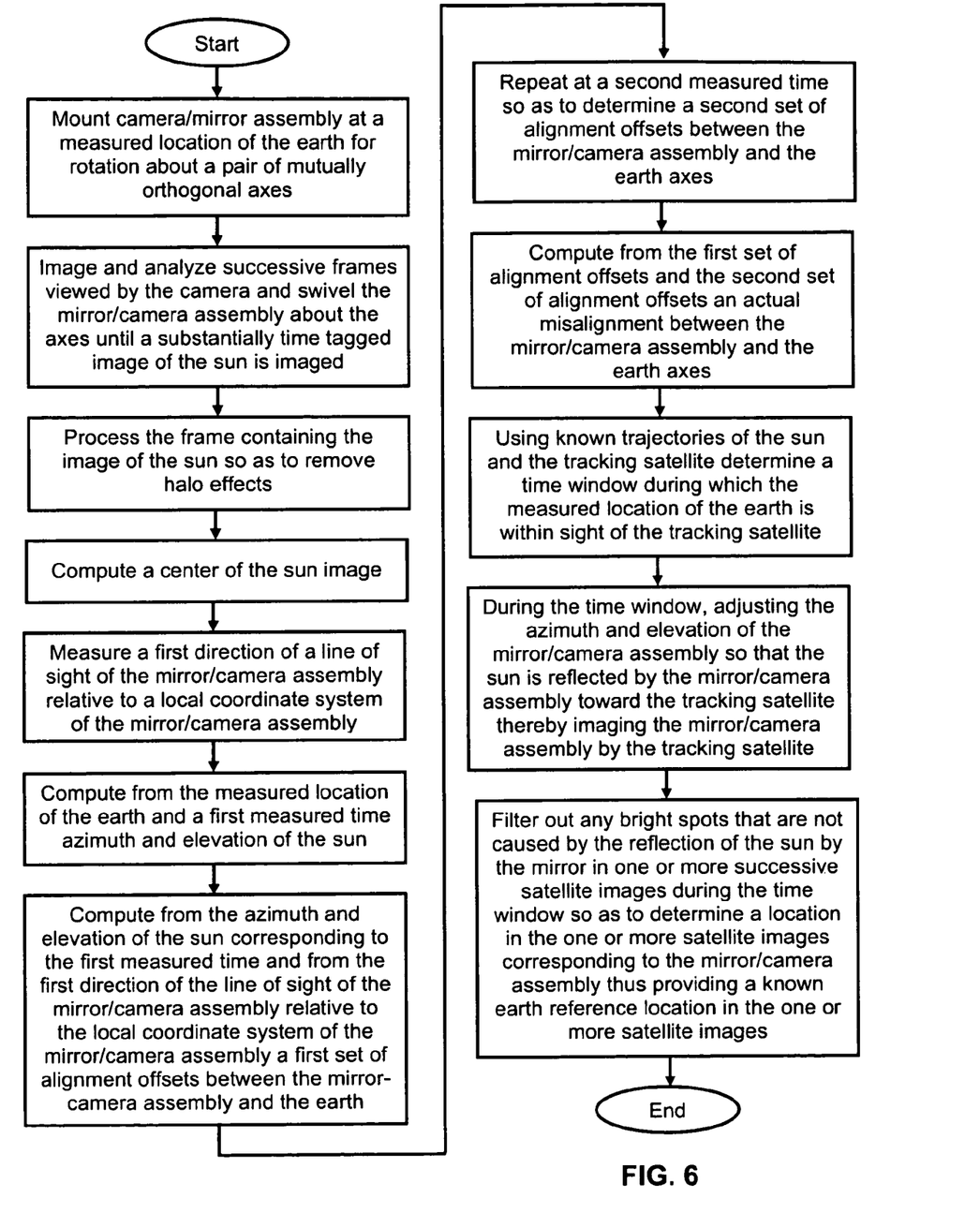
FIG. 6 is a flow diagram showing the principal operations carried out by a method for tracking a satellite according to a second embodiment of the invention.

FIG. 6 is a flow diagram showing the principal operations carried out by a method for tracking an airborne imaging system such as a satellite according to a second embodiment of the invention. Thus, at a measured location of the earth a camera/mirror assembly 11 is mounted for rotation about a pair of mutually orthogonal axes 15, 16. The camera/mirror assembly 11 includes a camera 13 mounted in fixed spatial relationship with respect to a mirror 12 and having a lens (not shown) focused on infinity and adapted to view through an aperture in the mirror. Successive frames viewed by the camera are imaged and analyzed and the mirror/camera assembly 11 is swiveled about its axes 15, 16 until an image of the sun is imaged. The frame containing the image of the sun is processed so as to remove halo effects and a center of the sun image is then computed.

A first direction of a line of sight 19 of the mirror/camera assembly is measured at a known time relative to a local coordinate system of the mirror/camera assembly. Azimuth and elevation of the sun are now computed from the measured location of the earth and a first measured time based on a model of a trajectory of the sun that correlates movement of the earth relative to the sun to a known time of day for each day in the solar cycle. The azimuth and elevation of the sun corresponding to the first measured time, and the first direction of the line of sight of the mirror/camera assembly relative to the local coordinate system of the mirror/camera assembly are now used to calculate a first set of alignment offsets between the mirror/camera assembly and the earth. This process is repeated at a second measured time so as to determine a second set of alignment offsets between the mirror/camera assembly and the earth axes.

The first and second sets of alignment offsets are used to compute an actual misalignment between the mirror/camera assembly and the earth axes. Known trajectories of the sun and the tracking satellite are used to determine a time window during which the measured location of the earth is within sight of the tracking satellite. During this time window, the azimuth and elevation of the mirror/camera assembly are adjusted so that the sun is reflected by the mirror/camera assembly toward the tracking satellite thereby imaging the mirror/camera assembly by the tracking satellite. Any bright spots that are not caused by the reflection of the sun through the mirror in one or more successive satellite images during the time window are filtered out so as to determine a location in each of the satellite images corresponding to the mirror/camera assembly thus providing a known earth reference location in the satellite images.

Figure 7A:
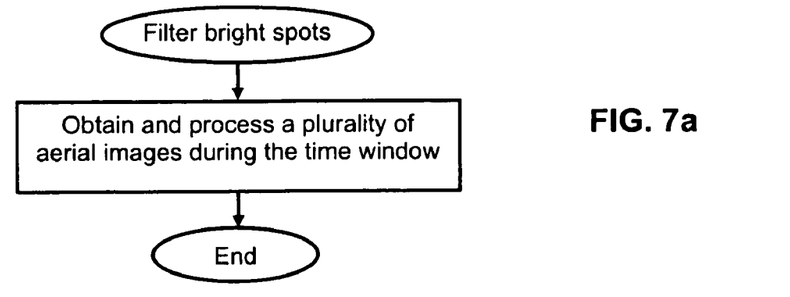
FIGS. 7a, 7b and 7c are flow diagrams showing additional operations carried out by the invention for filtering out bright spots due to the sun in accordance with different embodiments.
Figure 7B:
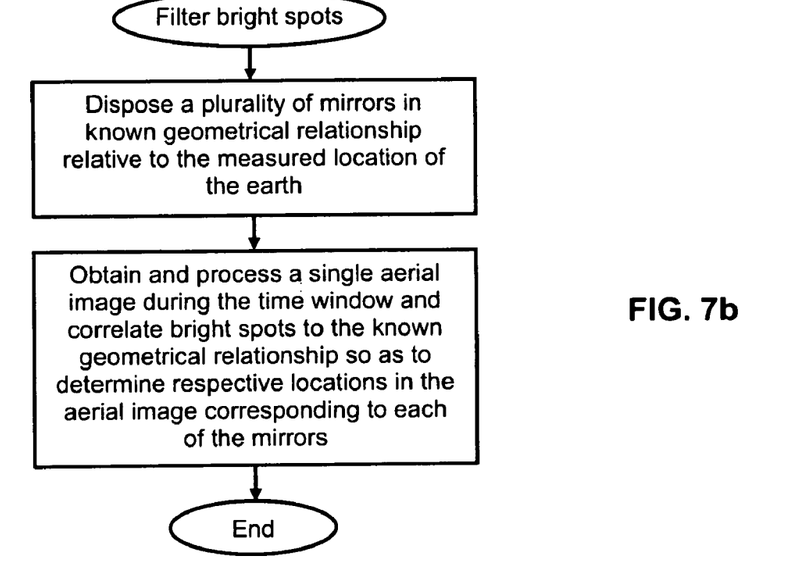
Figure 7C:
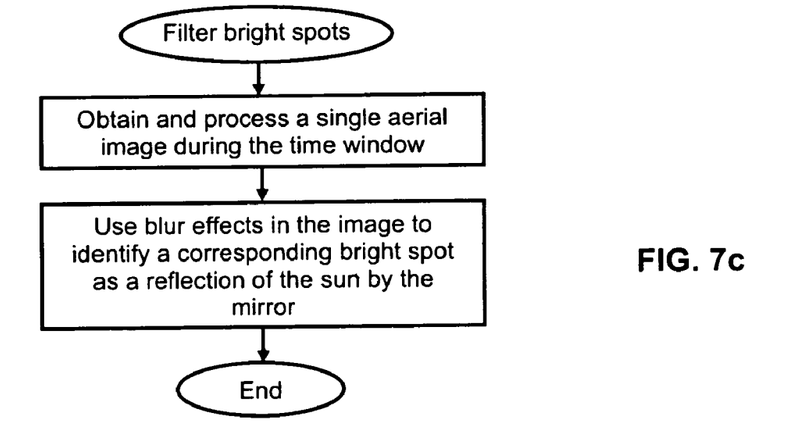

FIGS. 7a, 7b and 7c are flow diagrams showing additional operations carried out by the invention for filtering out bright spots due to the sun in accordance with different embodiments. Thus, as shown in FIG. 7a, bright spots may be filtered out by obtaining and processing a plurality of aerial images during the time window. Alternatively, as shown in FIG. 7b, a plurality of mirrors may be disposed in known geometrical relationship relative to the measured location of the earth. A single aerial image is then obtained and processed during the time window and bright spots are correlated to the known geometrical relationship so as to determine respective locations in the aerial image corresponding to each of the mirrors. Yet another possibility based on specific satellite camera characteristics as shown in FIG. 7c is to obtain and process a single aerial image during the time window; and to provide sufficiently high light density for using blur effects in the image to identify a corresponding bright spot as a reflection of the sun by the mirror. In this case the mirror size should be large enough to obtain saturation of the pixels in the satellite camera so as to create blur.

Figure 8:
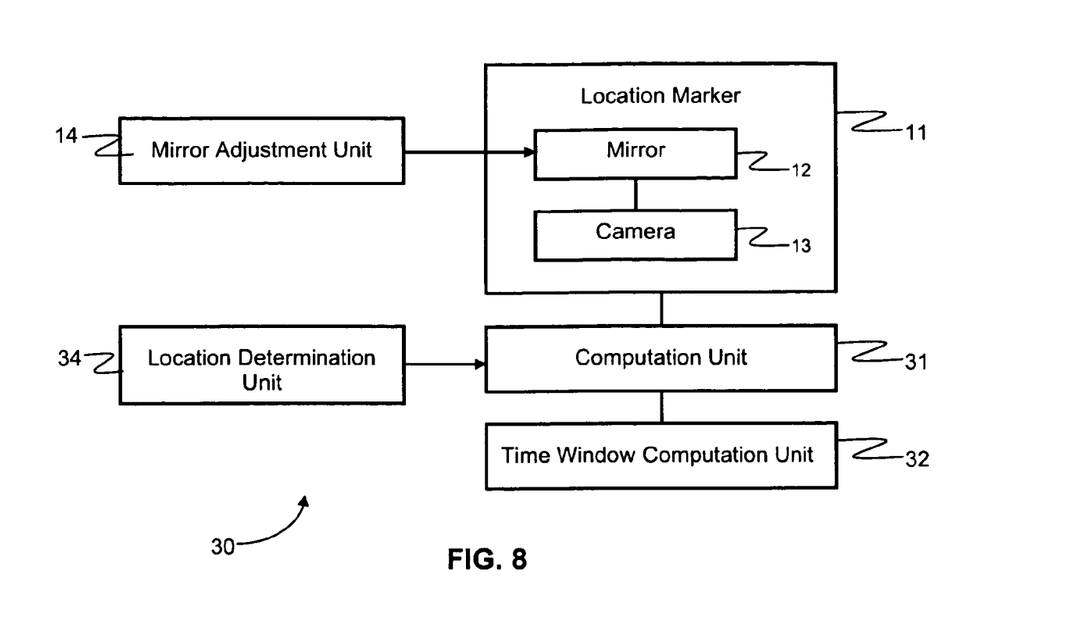
FIG. 8 is a block diagram showing functionality of a system for tracking a satellite according to an embodiment of the invention.

FIG. 8 is a block diagram showing functionality of a system 30 for tracking a satellite according to an embodiment of the invention. The system 30 comprises a location marker 11 comprising a mirror 12 capable of tilting about mutually orthogonal axes to track the sun and reflect the sun to an airborne imaging system. The location marker 11 further comprises a camera 13 mounted in known spatial relationship with respect to the mirror 12 for imaging the sun during tracking by the mirror 12. A computation unit 31 is coupled to the location marker and is responsive to an image of the sun imaged by the camera to obtain a transformation of mirror axes relative to axes of the earth at a mirror location on the earth where the mirror is mounted. A time window computation unit 32 is responsive to the model of the sun's trajectory and to the known trajectory of the satellite for computing a time window when the mirror is within a line of sight of the airborne imaging system and the sun within line of sight of the mirror. The time window is limited by the effective mirror area, which depends on the angle between the line of sight of the sun and the normal vector of mirror surface. The effective mirror area determines the density of the sunlight reflected by the mirror. A pan-tilt unit 14 (constituting a mirror adjustment unit) is coupled to the location marker 11 for adjusting azimuth and elevation of the mirror so that the sun is reflected by the mirror toward the airborne imaging system thereby capturing an image of the mirror in an aerial image produced by the airborne imaging system. A location determination unit 34 is coupled to the computation unit 31 for determining a location in the aerial image corresponding to the mirror thus providing a known earth reference location in the aerial image.

Figure 9:
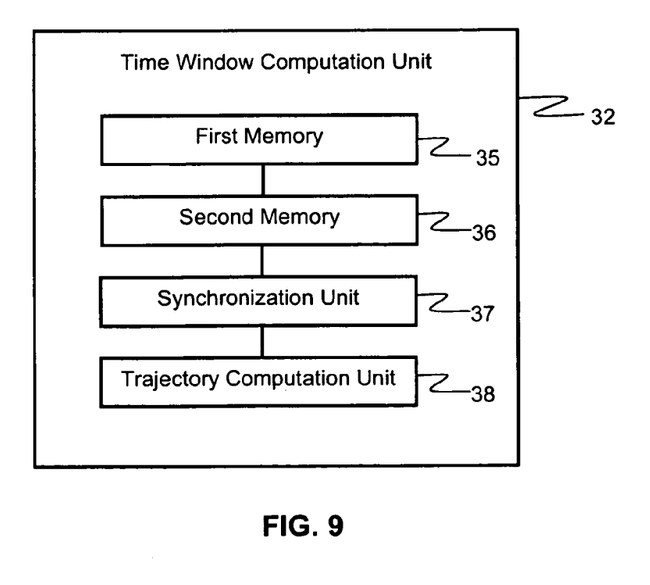
FIG. 9 is a block diagram showing a detail of a time window computation unit used in the system shown in FIG. 8.

FIG. 9 is a block diagram showing a detail of the time window computation unit 32. A first memory 35 stores a model of a trajectory of the sun allowing computation of azimuth and elevation of the sun relative to the earth at any given calendar time. A second memory 36 stores a model of a trajectory of the airborne imaging system, so as to allow computation of azimuth and elevation of the airborne imaging system relative to the earth. A synchronization unit 37 synchronizes mirror movement with the sun and the satellite movements during the satellite tracking and provides accurate time tagging of the sun images during the self-alignment procedure. A trajectory computation unit 38 is coupled to the first memory 35 and to the second memory 36 for computing the time window from the respective trajectories of the sun and the airborne imaging system and the transformation of the mirror axes relative to earth axes at the mirror location.

It will be appreciated that modifications will be apparent to those skilled in the art. For example, while in the above description, the mirror 12 is substantially planar mirror it may also be curved for reducing the required accuracy of self-alignment procedure and satellite tracking. It should be noted that the light density will be reduced in this case and may be compensated for by increased mirror size.

Furthermore, while in the mirror/camera assembly as described the camera is mounted integral with the mirror and in fixed spatial relationship with respect to the mirror, the camera may instead be mounted independent of the mirror so long as it is in fixed spatial relationship with respect to the mirror. In either case, the camera lens should be focused substantially on infinity.

It will also be understood that the system according to the invention may include a suitably programmed computer that processes the images and controls the pan-tilt unit. Likewise, the invention contemplates use of a computer program being readable by a computer for processing the images and controlling the pan-tilt unit in accordance with the invention. The invention further contemplates a machine-readable memory tangibly embodying a program of instructions executable by the machine for processing the images and adjusting the pan-tilt unit in accordance with the invention so as to provide a known reference point for an airborne imaging system.

The invention claimed is:

1. Method for providing a known reference point for an airborne imaging system, the method comprising:
    (a) providing at measured earth co-ordinates a camera/mirror assembly having a camera and a mirror mounted in fixed mutual spatial relationship and capable of tilting about two mutually orthogonal axes;
    (b) using said camera to track the sun and produce at least two or more different measured times respective time tagged camera images;
    (c) using said time tagged camera images to obtain a transformation of mirror axes relative to axes of the earth at a mirror location on the earth where the mirror is mounted;
    (d) during a time window when the mirror is within a line of sight of the airborne imaging system and the sun, adjusting the azimuth and elevation of the mirror so that the sun is reflected by the mirror toward the airborne imaging system thereby capturing an image of the mirror in an aerial image produced by the airborne imaging system; and
    (e) determining a location in the aerial image corresponding to the mirror thus providing a known earth reference location in said aerial image.

2. The method according to claim 1, wherein the airborne imaging system orbits the earth according to a known trajectory.

3. The method according to claim 2, including using known trajectories of the sun and the airborne imaging system to determine said time window.

4. The method according to claim 1, wherein the location in the aerial image corresponding to the mirror is determined by locating a reflection by the mirror of the sun in the aerial image.

5. The method according to claim 4, including filtering out any bright spots that are not caused by the reflection of the sun by the mirror.

6. The method according to claim 5, wherein filtering out any bright spots includes obtaining and processing a plurality of aerial images during said time window.

7. The method according to claim 5, wherein filtering out any bright spots includes:
    i) disposing a plurality of mirrors in known geometrical relationship relative to said mirror location;
    ii) obtaining and processing a single aerial image during said time window and correlating bright spots to said known geometrical relationship so as to determine respective locations in the aerial image corresponding to each of the mirrors.

8. The method according to claim 5, wherein filtering out any bright spots includes:
    i) obtaining and processing a single aerial image during said time window; and
    ii) providing sufficiently high light density for using blur effects in said image to identify a corresponding bright spot as a reflection of the sun by the mirror.

9. Method for providing a known reference point for a satellite image, the method comprising:
    (a) mounting at a measured location of the earth a camera/mirror assembly for rotation about a pair of mutually orthogonal axes, the camera/mirror assembly including a camera mounted in fixed spatial relationship with respect to a mirror and having a lens focused on infinity and adapted to view through an aperture in the mirror;
    (b) imaging and analyzing successive frames viewed by the camera and swiveling the mirror/camera assembly about said axes until an image of the sun is imaged;
    (c) processing the frame containing the image of the sun so as to remove halo effects;
    (d) computing a center of the image of the sun;

(e) measuring a first direction of a line of sight of the mirror/camera assembly relative to a local coordinate system of the mirror/camera assembly;
(f) computing from said measured location of the earth and a first measured time azimuth and elevation of the sun;
(g) computing from said azimuth and elevation of the sun corresponding to the first measured time and from said first direction of the line of sight of the mirror/camera assembly relative to the local coordinate system of the mirror/camera assembly a first set of alignment offsets between the mirror/camera assembly and the earth;
(h) repeating from (b) at a second measured time so as to determine a second set of alignment offsets between the mirror/camera assembly and the earth axes;
(i) computing from the first set of alignment offsets and the second set of alignment offsets an actual misalignment between the mirror/camera assembly and the earth axes;
(j) using known trajectories of the sun and the tracking satellite determining a time window during which said measured location of the earth is within sight of the tracking satellite;
(k) during said time window, adjusting the azimuth and elevation of the mirror/camera assembly so that the sun is reflected by the mirror/camera assembly toward the tracking satellite thereby imaging the mirror/camera assembly by the tracking satellite; and
(l) filtering out any bright spots that are not caused by the reflection of the sun through said mirror in one or more successive satellite images during said time window so as to determine a location in said one or more satellite images corresponding to the mirror/camera assembly thus providing a known earth reference location in said one or more satellite images.

10. The method according to claim 9, including processing more than two frames for improving alignment accuracy.

11. The method according to claim 9 wherein filtering out any bright spots includes obtaining and processing a plurality of images during said time window.

12. The method according to claim 9 wherein filtering out any bright spots includes:
   i) disposing a plurality of mirror/camera assemblies in known geometrical relationship relative to said measured location of the earth;
   ii) obtaining and processing a single image during said time window and correlating bright spots to said known geometrical relationship so as to determine respective locations in the image corresponding to each of the mirror/camera assemblies.

13. The method according to claim 9, wherein filtering out any bright spots includes:
   i) obtaining and processing a single image during said time window; and
   ii) providing sufficiently high light density for using blur effects in said image to identify a corresponding bright spot as a reflection of the sun by the mirror/camera assembly.

14. The method according to claim 1, including using a substantially planar mirror.

15. The method according to claim 1, including using a curved mirror.

16. System for providing a known reference point for an airborne imaging system, the system comprising:
   a location marker comprising a mirror capable of tilting about mutually orthogonal axes to track the sun and reflect the sun to said airborne imaging system;
   a camera mounted in known spatial relationship with respect to the mirror for imaging the sun during tracking;
   a computation unit coupled to the location marker and responsive to an image of the sun imaged by said camera to obtain a transformation of mirror axes relative to axes of the earth at a mirror location on the earth where the mirror is mounted;
   a time window computation unit for computing a time window when the mirror is within a line of sight of the airborne imaging system and the sun within line of sight of the mirror;
   a mirror adjustment unit coupled to the location marker for adjusting azimuth and elevation of the mirror so that the sun is reflected by the mirror toward the airborne imaging system thereby capturing an image of the mirror in an aerial image produced by the airborne imaging system; and
   a location determination unit for determining a location in the aerial image corresponding to the mirror thus providing a known earth reference location in said aerial image.

17. The system according to claim 16, wherein the time window computation unit includes:
   a first memory storing a model of a trajectory of the sun allowing computation of azimuth and elevation of the sun relative to the earth at any given calendar time;
   a second memory storing a model of a trajectory of the airborne imaging system allowing computation of azimuth and elevation of the airborne imaging system relative to the earth;
   a synchronization unit for synchronizing mirror movement with the sun and the satellite movements during satellite tracking and for providing accurate time tagging of the sun images; and
   a trajectory computation unit coupled to the first memory and to the second memory for computing said time window from the respective trajectories of the sun and the airborne imaging system and the transformation of the mirror axes relative to earth axes at said mirror location.

18. The system according to claim 17, wherein the mirror is substantially planar mirror.

19. The system according to claim 17, wherein the mirror is curved.

* * * * *